United States Patent
Carter et al.

Patent Number: 6,091,482
Date of Patent: Jul. 18, 2000

[54] METHOD OF MAPPING AND INTERLACING IMAGES TO A LENTICULAR LENS

[75] Inventors: Steven M. Carter; Steven J. Clemens; Jennifer P. Mueller; Randall L. Peek, all of County of St. Louis, Mo.

[73] Assignee: Reynolds Metals Company, Richmond, Va.

[21] Appl. No.: 08/862,028

[22] Filed: May 22, 1997

[51] Int. Cl.$^7$ .................................................. G03B 27/02
[52] U.S. Cl. .................................. 355/79; 355/77; 355/22
[58] Field of Search .................................... 355/22, 77, 79, 355/33; 359/619, 621, 455

[56] References Cited

U.S. PATENT DOCUMENTS

| Re. 35,029 | 8/1995 | Sandor et al. | 355/22 |
|---|---|---|---|
| 5,113,213 | 5/1992 | Sandor et al. | 355/22 |
| 5,365,294 | 11/1994 | Anderson | 354/112 |
| 5,488,451 | 1/1996 | Goggins | 355/77 |
| 5,847,808 | 12/1998 | Goggins | 355/22 |
| 5,896,230 | 4/1999 | Goggins | 359/619 |
| 5,924,870 | 7/1999 | Brosh et al. | 434/365 |

Primary Examiner—Kimberly A. Williams
Assistant Examiner—Derrick Fields
Attorney, Agent, or Firm—Alan M. Biddison

[57] ABSTRACT

A lenticular preprinting process producing a composite image which, when printed, is assembled with a lenticular lens material (18). The composite image is developed from a plurality of images (A–D) which include both graphic and textual images. Each of the respective images are digitized and a pixel array for the image is formed. Separate digital files are created for each image. Next, computerized files are separately created for continuous tone images and for linework images. From these computerized files, separate raster image files for the continuous tone and linework images are produced. Next, segments from each raster image file is combined in a predetermined sequence with segments from the other raster image files to separately interlace the respective continuous tone and line work images. The resulting combined files are now linked to produce an image having both continuous tone and linework constituents. An image plot is now produced whose characteristics represent a map of the interlaced continuous tone and linework images and which includes one or more desired visual effects.

24 Claims, 8 Drawing Sheets

TYPICAL LENTICULAR SHEET
CROSS SECTION
HALF CYLINDRICAL LENSES

2 IMAGES A & B INTERLACED

FIG. 6

AA BBB CCC DD

OFCT            OFLW

METHOD OF MAPPING AND INTERLACING IMAGES TO A LENTICULAR LENS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to lenticular lens processes, and more particularly, to a method of producing very high quality interlaced image plots having exceptionally sharp, smooth type and line edges for conveying various desired visual effects when the image plots are printed and subsequently viewed through a properly positioned and aligned sheet of lenticular lens material.

Lenticular lens processes are well-known in the art. In commercial applications, for example, they are used to produce advertisement or promotional materials including graphic images and textual materials (it being appreciated that textual materials can also be considered as graphic images). Although there are a number of visual effects which can be created using lenticular lens processes, the most common effect is one in which a first image appears as a piece of lenticular lens is held at one angle, but a second and different image appears if the piece is held at a different angle. As described hereinafter, the images are generally referred to as "interlaced" images; that is, the respective images are divided into respective strips or segments with the segments of one image then being arranged between adjacent segments of the other image. The rearranged images are then viewed through a sheet of the lenticular lens material. Such a sheet is typically flat on one side, this flat side being fitted over the rearranged images. The other side of the sheet typically has a series of half cylindrical (convex) shaped lenses formed on it, each lens typically extending linearly along one side of the sheet, parallel to the respective image segments, and parallel to the other lenses formed on the sheet. The spacing between adjacent lens' segments may vary from one sheet to another, and the number of lens' segments formed on a particular sheet is generally referred to as lenses or lenticules per inch, or LPI.

It is known that images which are interlaced may be the same image photographed from different angles. This was originally accomplished using a stereographic camera which exposed the same object or scene through slit-like gratings. The resulting photograph of the object or scene comprised interlaced slices of the image exposed onto the same sheet of film. A problem with this technique was the requirement to recreate the object in such a manner that everything surrounding the object remained perfectly still and motionless during the time it took to produce the multiple images of the object. It was difficult to incorporate textual material in the final product using this approach. Also, this process was limited in that while it could produce "flip" images, and could also provide an illusion of depth, it could not produce many of the desired effects available today. These effects include "apparent" motion, zooming in or out, transformation ("morphing") of one image into another, and more sophisticated simulation of depth; i.e., three-dimensional or 3D effects.

With the introduction of silver based film lithography and contact processes, it became possible to make separate images of an object on separate sheets of film. Now, with the use of slit-like masks and proper registration, these multiple contact exposures could be interlaced so two or more images were merged onto one sheet of film. While processes developed using silver based film addressed some of the drawbacks of the stereographic techniques, these and other lenticular processes are time consuming, relatively expensive, and still do not allow for ready merging of more than one effect onto the same set of interlaced films.

Development of improvements to lenticular processes is on-going. In U.S. Pat. No. 5,488,541, for example, there is described a method for producing multidimensional lithographic separations free of moiré interference. According to the process, non-binary pixels forming an image are converted to separate color plates prior to the images being interlaced and a film of the interlaced images being plotted. The process makes use of first order stochastic screening in which all of the printed dots comprising an image are of the same size (diameter). These dots are placed in a non-matrix arrangement such that the number of dots in any area of the image produces a variation (shade) in the solid color produced when an area is solidly filled with dots of the same color. Absence of color results when no dots are present in an area. It is a drawback of this process that it does not use the full resolution capabilities of film plotters now commonly in use for prepress or graphic arts material.

U.S. Reissue Pat. No. 35,029 to Sandor, et al., teaches a method of preparing three-dimensional autostereoscopic images of an object. The method teaches incorporating side perspectives of the object, and utilizes a preferred printing direction. More than two different views of the objects must be interlaced in order to distinguish the object from a binocular or stereoscopic image of it.

Continuing and common disadvantages of these and previous processes include such matters as the resolution of images in pixelized or bitmap forms with the textual material and lines composed of noticeable blocks. In addition, there are stair steps or "jaggies" on the edges of images which detracts from the sharpness and crispness of a final image when viewed through a lenticular material.

BRIEF SUMMARY OF THE INVENTION

Among the several objects of the present invention may be noted the provision of a method of performing a lenticular prepress operation by which a plurality of graphic and textual images can be combined to produce a high resolution film plot of properly interlaced images, continuous tone and linework files, digital files of the interlaced images for use by printers equipped to work with digital files and/or employing computer to plate technologies, and color plates for each of the four basic colors used in printing processes (and/or additional or different plates for one or more specialized colors if a customer so desires), the plates subsequently being used to print lenticular materials having the highest quality of sharpness and clarity regardless of whether used in lithographic, offset, screen, gravure or flexographic printing;

the provision of such a process usable with a variety of inputs including, but not limited to, color transparencies, line art, illustrations, electronic files, and video frames, and which can be processed in accordance with defined specifications, instructions, samples, and concepts, and which produces plotted, interlaced film images that when printed and viewed through a lenticular lens to which they were mapped, convey a variety of visual effects;

the provision of such a process to produce such a variety of visual effects which are achievable both individually or in combination with properly mapped and interlaced images;

the provision of such a process to achieve phase flips by which one image changes to another image as the angle of viewing changes, multi phase effects to simulate motion (including rotation of an object) by creating a series of intermediary views of an object as the angle of viewing is changed, zooming of an image toward or away from a viewer, morphing of an image by which the image is gradually transformed into something different through a series of intermediary images, and simulated 3-D or depth;

the provision of such a process which is usable with a wide range of transparent lenticular lens materials with the images employed being properly mapped and registered with the lens material to be used in the final printed product;

the provision of such a process to generate halftone printing dots by a raster image processor (RIP) just prior to plotting of an image map by a plotting mechanism so to produce smaller, more efficient file transfer to a RIP and plotter, and faster plotting of films;

the provision of such a process in which the plotted linework images are of exceptionally high quality and in which linework image layers create type and line art having very smooth edges;

the provision of such a process by which an interlaced multi color (typically a four color) file is transferred to a RIP where both color separation and halftone screening information is produced in a digital data format, this data then being used to generate a set of plotted, registered color films; and, the provision of such a process which allows for a more efficient file organization to transfer digital data to a RIP.

In accordance with the invention, generally stated, a lenticular prepress process produces a composite image which, when printed, is assembled with a lenticular lens material. The composite image is developed from a plurality of images which may be derived from a number of different sources and may include graphic displays, textual images, or both. Initially, each of the respective images is digitized and an array of pixels is formed representing the respective image. A separate digital file is created for each image. Next, computerized files are separately created for continuous tone images and for linework images. From these computerized files, separate raster image files for the continuous tone and linework images are produced. Next, segments from each raster image file are combined in a predetermined sequence with segments from the other raster image files to separately interlace the respective continuous tone and line work images. The resulting combined files are now linked to produce an image having both continuous tone and linework constituents. An image plot is now produced whose characteristics represent a map of the interlaced continuous tone and linework images and which includes one or more desired visual effects. Other objects and features will be in part apparent and in part pointed out hereinafter.

BRIEF DESCRIPTION OF THE SEVERAL VIEWS OF THE DRAWINGS

In the drawings.

FIG. 6 is a representation of a predetermined pattern by which the sections or slices of each of the digitized images will be interleaved with one another;

FIG. 7 is a representation of the interleaving of the images with a selected sheet of lenticular lens material;

FIG. 8 is a representation of the resulting portions of each image matrix which are used in the interleaved pattern of images;

Corresponding reference characters indicate corresponding parts throughout the drawings.

DETAILED DESCRIPTION OF THE INVENTION

Figure 1:
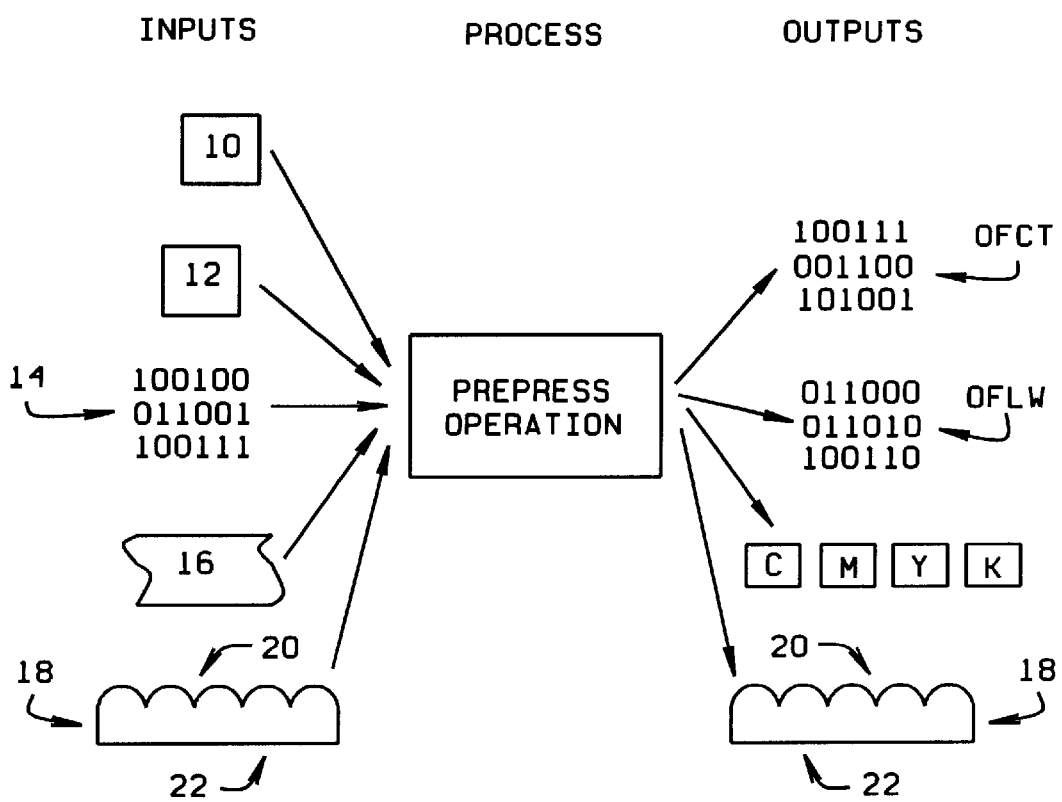
FIG. 1 is a simplified representation of the prepress process of the present invention illustrating the inputs used with the process and the outputs produced by the process.
Figure 3:
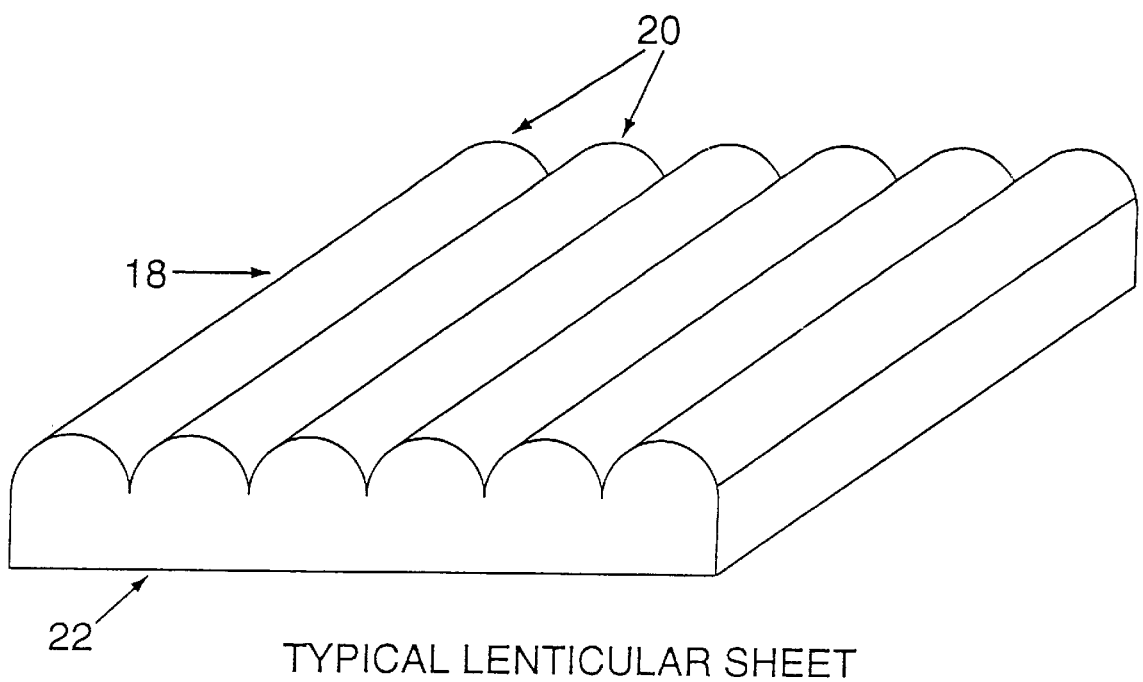
FIG. 3 is a perspective view of a section of a lenticular sheet of material used with the process.
Figure 11:
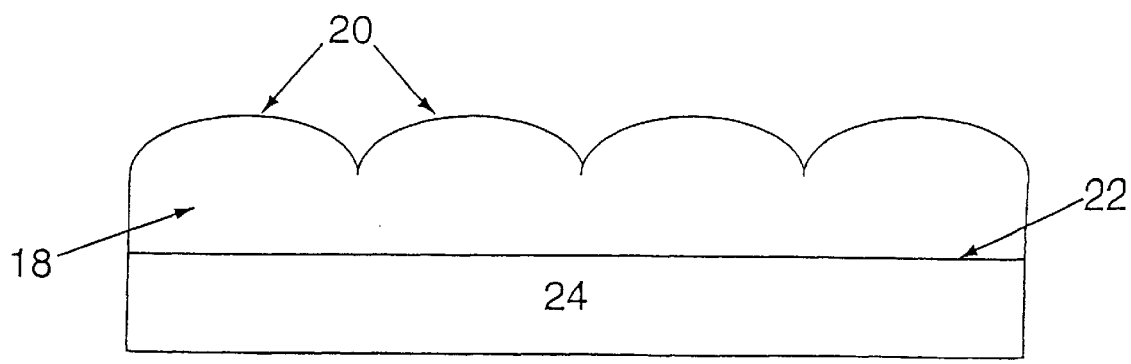

Referring to the drawings, the lenticular prepress method of the present invention is usable with a variety of inputs available in different media and which incorporate graphic or visual images as distinguished from textual material which can also be used. As shown in FIG. 1, these inputs may include slides 10 or color transparencies, line art or illustrations 12, electronic files 14 by which an image is formatted in a digital pixel array, and video frames 16 such as are obtained from film or videotape. These are used in conjunction with a sheet 18 of a lenticular lens material. The manner in which the artwork is obtained is immaterial to this invention. Similarly, it will be understood that sheets of lenticular lens material such as shown in FIG. 3 are commercially available from a variety of sources and that the lens material, its design and construction similarly form no part of this invention. Those versed in the art understand that for each different type of lenticular lens material, there are a given number of individual convex (typically half-cylinder) shaped lens 20 formed on one side of a sheet 18, and that the underside 22 of the sheet is flat. When the final product 24 resulting from the prepress operation is printed, the sheet of lenticular lens material is placed over the printing, flat side down as shown in FIG. 11. Thereafter, when someone changes the angle at which the sheet of printed material is viewed, different visual effects will be observed. Upon completion of the process, and as described hereinafter, there are produced separate digital output files OFCT and OFLW for continuous tone and linework aspects, respectively, of the desired printed matter. In addition, separate files (C, M, Y, and K) are provided for each of the four colors (Cyan, Magenta, Yellow, and Black) used in the final printing operation. Although not shown, files can also be provided for any special colors requested by the customer. And, these outputs will produce a printed product compatible with the sheet 18 of designated lenticular lens material.

Figure 2:
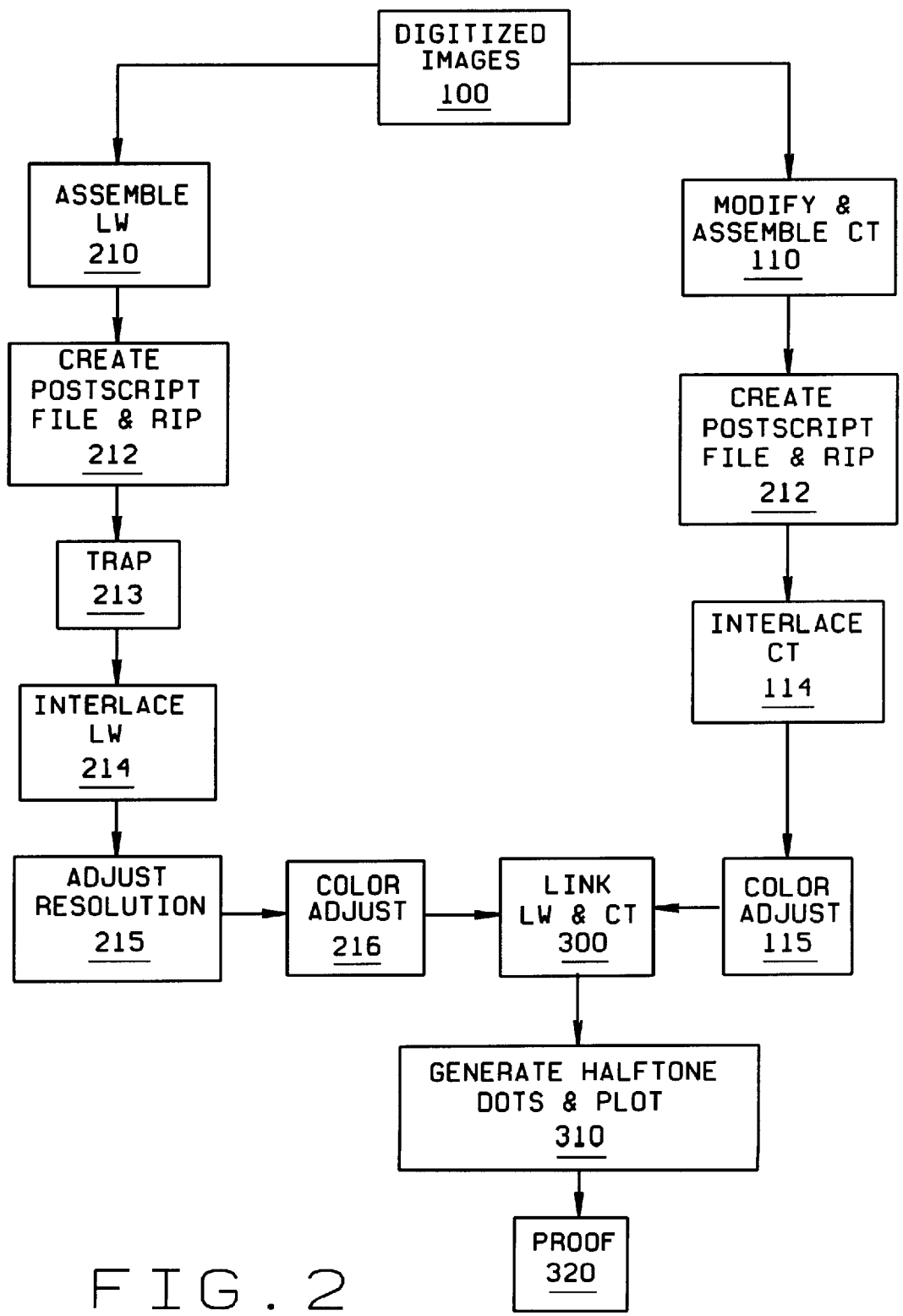
FIG. 2 is a flow diagram of the process or method of the present invention.

Referring to FIG. 2, the steps for performing the prepress operation of the present invention involve separate operations for continuous tone and linework graphics. After each has been separately processed, the results are linked to produce the resulting output materials as described above. As a preliminary step prior to initiation of the process, the final product must first be designed. That is, the customer and user of the process must first agree on what visual effects are to be incorporated in the final product. These can vary from simple two-phase or "flip" arrangements in which the viewer sees one image when the product is viewed from one angle, and a different image when the object is viewed at a different angle. A more sophisticated version of this visual effect is a multi-phase arrangement in which the viewer is given an impression of motion as the angle of viewing changes because a series of images are now successively seen. A similar effect involving a plurality of successively viewed images is the transformation ("morphing") of an object into a different object. Other possible visual effects include zooming in or out to make an object appear to be moving closer to or away from the viewer, and 3-D effects in which an illusion of depth is created. It will be understood that these effects can be employed in any combination as well as singly.

In addition to determining which visual effects are to be incorporated, another element to be determined is the orientation of the sheet of lenticular lens material. That is, are the effects to be observed by moving the product from side-to-side, or up-and-down. Whichever direction is chosen will determine the axis of rotation of the sheet of lenticules. Besides the axis of rotation, it is also important to know to what frequency of the lenticular lens material will the images be mapped. As noted, a sheet 18 of lens material may come in one of a number of LPI's. If the sheet has 67 LPI's, the resulting mapping of a given number of images will be different than for a sheet having 50 LPI's.

Figure 4A:
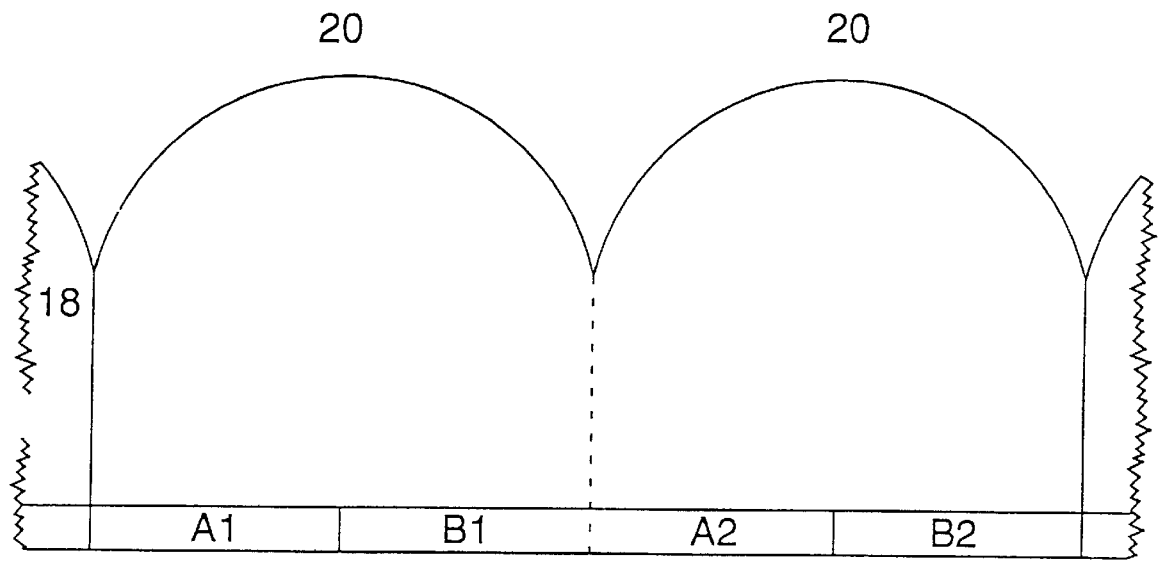
FIGS. 4A and 4B represent different lenticular lens materials used with different image interlacing arrangements.
Figure 4B:
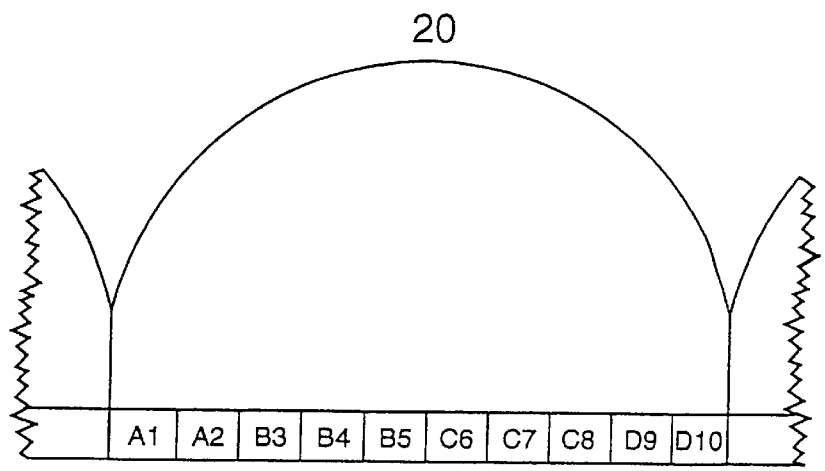

Additional information used in the process includes the number of images incorporated in the product. As discussed above, this can be as few as two (as in a "flip") to a large number of images for motion, morphing, zoom and 3-D effects. Besides the number of images, the number of image slices which will be interlaced must also be determined. As shown in FIGS. 4A and 4B, the number of slices can be varied. For the "flip" effect of FIG. 4A, only a single slice A1, B1, or A2, B2 of each image is interlaced and viewed beneath a lenticule. Or, as seen in FIG. 4B, a greater number of slices; ten, for example, taken from four separate images (A1, A2, B3, B4, B5, C6, C7, C8, D9, D10) can be viewed behind each lenticule. Those skilled in the art will appreciate that FIG. 4B is representative only and that many other combinations are possible without departing from the scope of the invention. As part of determining the number of images to be used, the resolution of the images; that is, the number of image pixels per slice, per inch or per millimeter is also determined.

Figure 5:
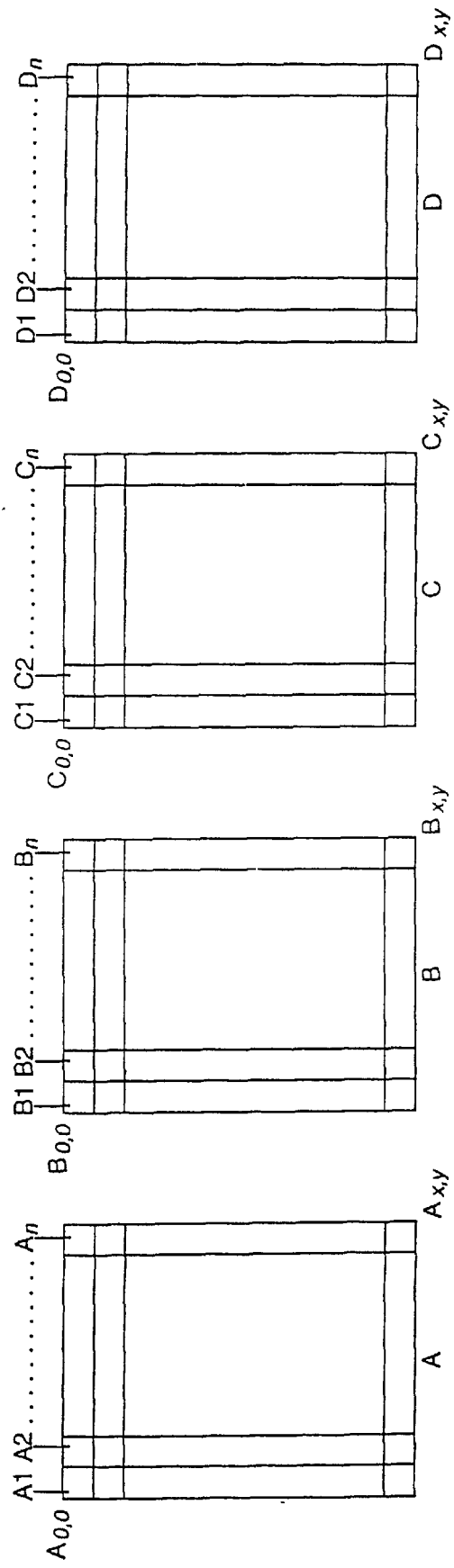
FIG. 5 is a simplified representation of a matrix array of pixels representing digitized images A, B, C, and D.

Having made the foregoing determinations, the images 10 or 12 or 16 as shown in FIG. 1 are now scanned and digitized representations of each respective image is produced. This is step 100 of the process as shown in the flow chart of FIG. 2. As part of this digitization, the respective pixels comprising each image are assigned both an address within the image, and a value representing the color content of the pixel. Referring to FIG. 5, each of the four images AD comprising FIG. 4B, is separately digitized and a pixel array is formed for each. Each separate array comprises a plurality of addresses ranging from 0,0 to x, y. It will be understood that in practicing the method of the invention, that it is not necessary that each initial array be identical in size. Rather, each array can be different in size from each of the other arrays. It will further be understood that new images can also be electronically produced, in any manner well-known in the art, with a similar pixel array being produced from this new image as well. After forming the pixel arrays for each image, and assigning address and color or tonal values for each pixel, separate digital files are created for each image type (continuous tone or linework) and these are maintained throughout the remainder of the process.

Once the files are created, they are processed to determine which portion of each file comprises a continuous tone (CT) portion of an image, and which portion comprises a linework (LW) portion of the image. Continuous tone refers to the graphic portion of the image, linework to the text portion of an image as well as line drawings (e.g., a line delineating a border) incorporated in the image, geometric artwork, fixed image segments, color tints, and smooth color tint gradations; and, in general, non-continuous tone images. It will be appreciated that an image may be completely graphic and contain no textual material, or vice versa, or as a combination of both. Each portion of an image is now processed separately as indicated by the flow chart of FIG. 2. This parallel processing has the advantage of allowing continuous tone portions of images to be processed as a separate layer from linework or run length encoded images.

With respect to the continuous tone portions of an image, as indicated at step 110, these portions are first modified or adjusted, as necessary, so all of the pixel arrays comprising the digital image files are uniform; that is, they now are of the same size and have the same image resolution. This process step can be performed using a computer program such as the program Photoshop which is commercially available from Adobe Systems Incorporated, of San Jose, Calif.; or the program QuarkXPress which is commercially available from Quark Inc., of Denver, Colo.

When step 110 is completed, the resulting images are now formed into new files, as indicated at step 112. These are referred to as raster image files and they are created using a computer language such as PostScript which is commercially available from Adobe Systems Incorporated of San Jose, Calif. As part of this step, the resolution in pixels per millimeter (ppm) is determined for the number of segments of each image which will be interlaced for viewing behind each lenticule. Also, marked portions of the composite image are identified. Marked portions are areas where linework material will be placed and therefore portions of images which fall into these areas can be identified.

Figures 6, 7, 8:
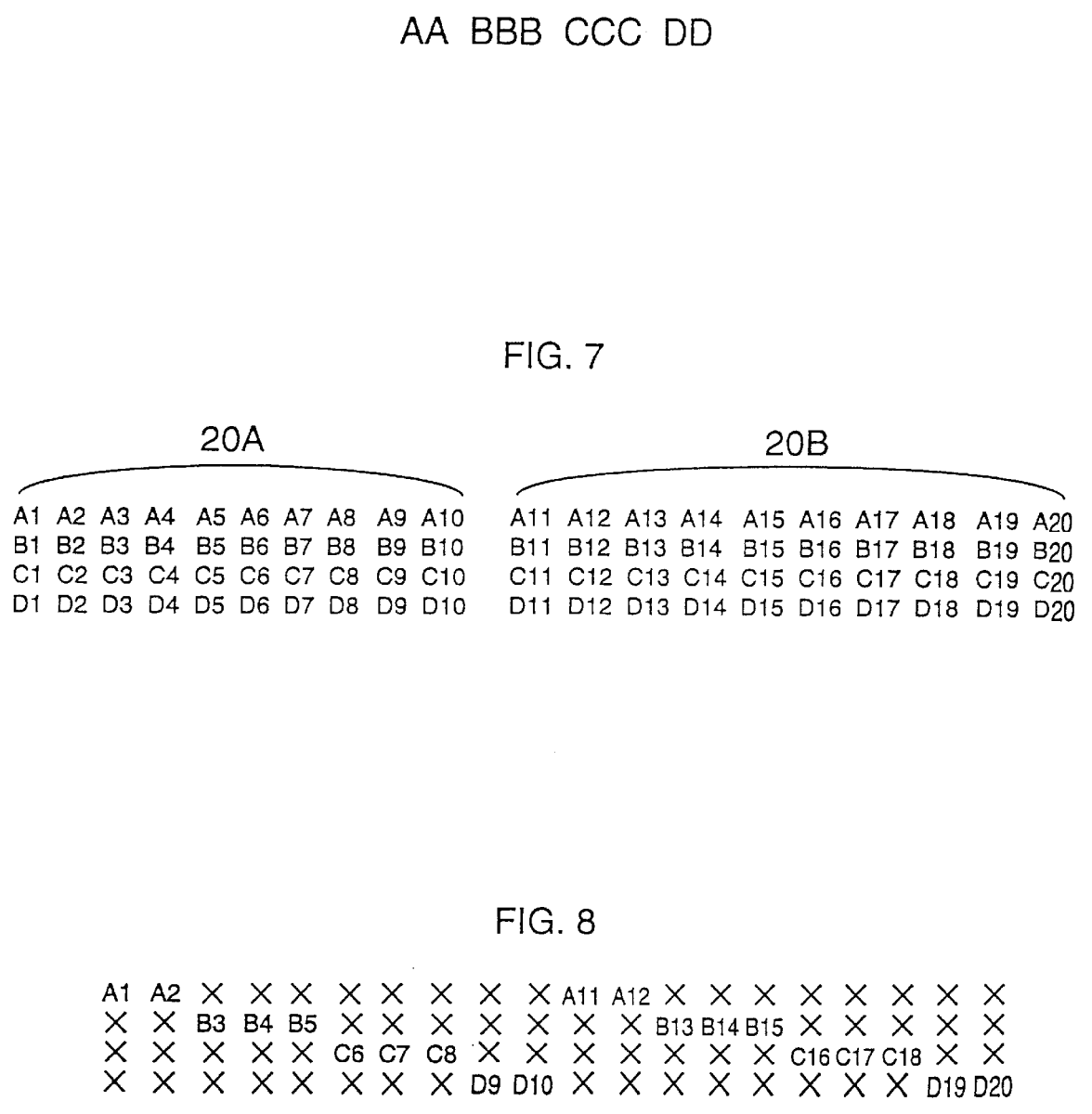

Referring to FIG. 6, the number of image slices or segments for each image is shown in accordance with the previously discussed FIG. 4B. In FIG. 6, it is shown that two adjacent slices of image A are to be interlaced with three adjacent slices of image B, three slices of image C, and two slices of image D. The ten slices, in this example, are encompassed by one lenticule 20 as shown in FIG. 4B, and also in FIG. 7. While the number of images slices is shown as ten, the number which can be conveniently encompassed by a lens varies between a minimum of two and an upper limit which is a function of the LPI of the sheet 18 of lenticular lens material used. Further, where more than two images are being interlaced, it is preferable to use at least two adjacent slices from each of the end image segments; i.e., images A and D in the drawings.

In FIG. 7, the respective segments of each image A–D are shown superimposed or layered over each other and beneath adjacent lenticules. As discussed, each segment contains a number of adjacent pixels comprising the pixel array for each digitized image. In accordance with the scheme of FIG. 6, and as shown in FIG. 8, adjacent segments A1, A2 are used in forming an interlaced image as required by process step 114. The respective segments B1, B2, C1, C2, and D1, D2 of the other images are not used and are effectively discarded. Next, the segments B3, B4, B5 of image B are interlaced with segments A1, A2. The corresponding segments of the images A, C, and D are again discarded. The process is repeated with respect to segments C6, C7, and C8 of image C, and segments D9, D10 of image D. In each instance, the corresponding segments of the other images are discarded. This produces the ten slices from the four separate images, all of which are viewed beneath the lenticule 20A.

Figure 9:
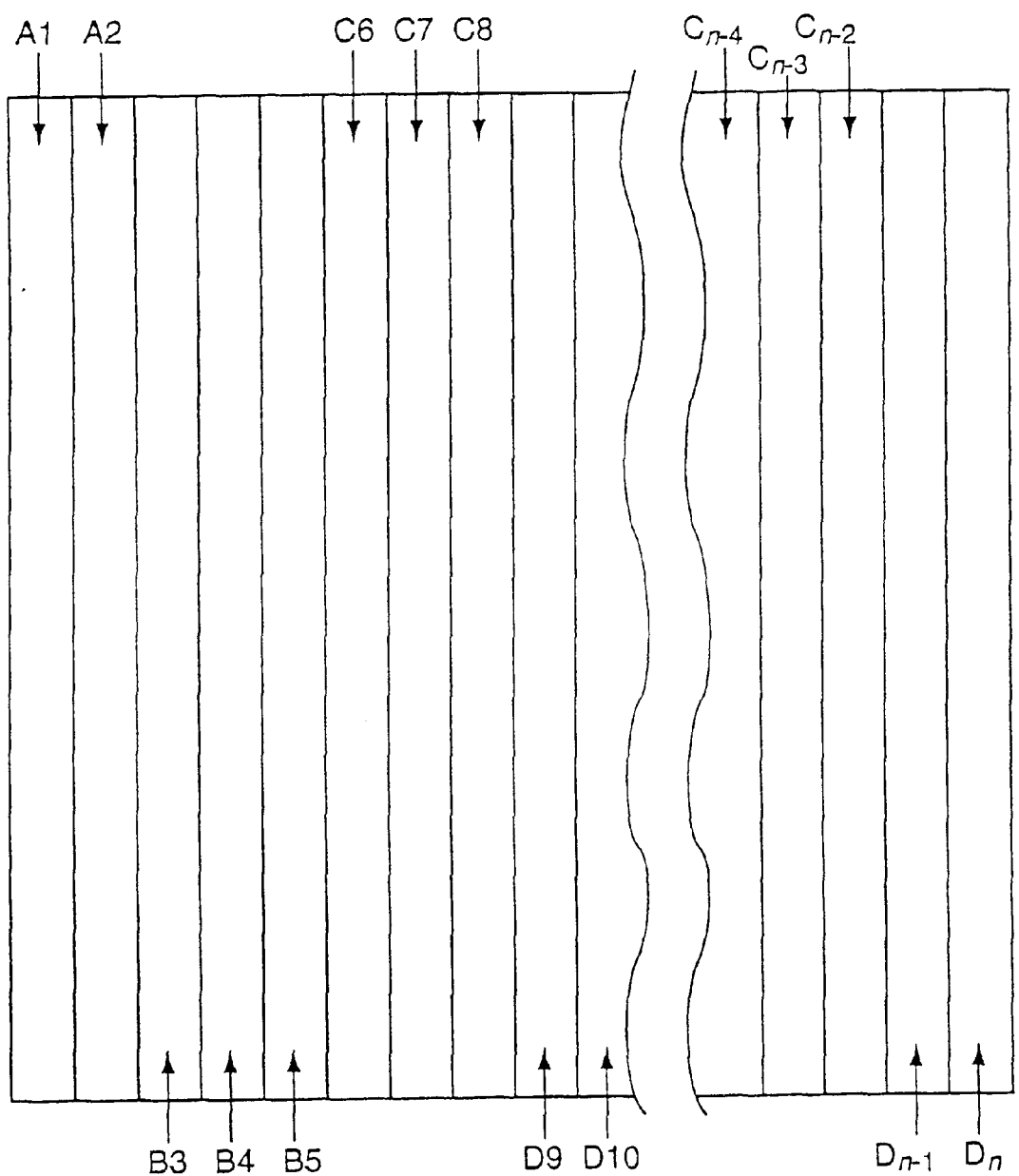
FIG. 9 is a simplified representation of the resulting matrix array of interleaved portions of the images.

After the segments of image D are interlaced with the segments of the other three images, the process is repeated beginning with image segment A11. For the next lenticule 20B, respective segments A11, A12, B13, etc. through segment D20, are interlaced with each other. Again, the respective segments of each image not used, are discarded. Referring to FIG. 9, the entire interlacing arrangement for the overall composite image is shown such that at the other end of the composite image, interlaced segments $C_{n-4}$, $C_{n-3}$, $C_{n-2}$, $D_{n-1}$, and $D_n$ form the last interlaced segments where n is the total number of slices forming the composite image. While the above description indicates that each segment taken from a particular reference image A–D for interlacing purposes is a different segment, that does not have to be so. Segments can be repeated, as can a sequence of segments. Doing so helps achieve certain visual effects such as speed of motion and object depth.

As a further part of this process step, the composite image is modified or adjusted to accommodate the particular lens 20 being used with the final product. It will be understood that even though a particular sheet of lenticular lens material has a specified LPI, there may be a variation between the actual number of lenticules from one portion of a sheet to another. Because any variation, however minor, effects the resulting visual effects of the final printed product, it is important that during the prepress operation of the present invention that any variations be identified, and differences between the sheet and the corresponding portion of the final image be resolved. That is, if more (or fewer) pixels from a segment are necessary to be included (or deleted) so there is a proper correspondence between the composite image and sheet of material, that accommodation is now made. This may mean, for example, that an image segment normally five pixels wide, may be six pixels wide at one location in the composite image, and only four pixels wide in others.

As shown in FIG. 2, if the final result from the prepress operation of the present invention includes linework material, this portion of the product can be processed in parallel with the continuous tone portion of the material. This part of the process includes steps 210 and 212 which are the same as steps 110 and 112 with respect to the linework images. Accordingly a discussion of these steps will not be repeated. After process step 212 is completed, a process step 213 is performed which is referred to as "trapping". Trapping is performed to, in effect, lock in, or register, which particular colors are used at particular locations in the composite image. By doing so, by identifying blocks or areas for a particular tone or tint, subsequent problems which might appear at the printing stage due to misregistration of colors are avoided. Trapping can be accommodated using a computer program such as FAF which is commercially available from Scitex Corporation, Ltd. of Herzliya, Israel.

After the trapping step is completed, an interlacing step 214 similar to step 114 is performed. Again, selected slices or segments from each image are assembled together in a predetermined, desired sequence. After interlacing is accomplished, a step 215 is performed in which the resulting interlaced linework is adjusted with respect to the lenticular sheet with which the final composite image is used. This is similar to the resolution adjustment performed with the continuous tone images after interlacing is completed.

Once the separate processing of continuous tone and linework portions of the final product are completed, the resulting linework and continuous tone files are now linked together as indicated at step 300 so the information contained in each file can be combined and the results plotted to form an overall bitmap of the composite image. The result is a pixel array having pixels representing both individual color or tonal elements, and pixels whose color or tonal value is constant over a defined segment of the composite image.

Once the final composite image is produced, a step 310 is performed for color separation of the composite image and generation of a halftone dot structure for each color of the four color plates previously referred to, and any special color plates which are used. Data bits which comprise the bitmap include data bytes. That is, where adjacent pixels may have different color or tonal values, a data bit representing one pixel, will be, for example, 32-bits and include the address (x, y co-ordinates in the composite image) of the pixel and separate bit values for each of the four primary colors from which the color at that location is derived. Corresponding information for an adjacent pixel is included in another data bit. If, however, there is a broad range of pixels all having the same color or tonal value, then a single data bit can be used. This bit will include the addresses of the first and last pixel in a continuum of pixels having that color, and a value representing the color.

Figure 10:
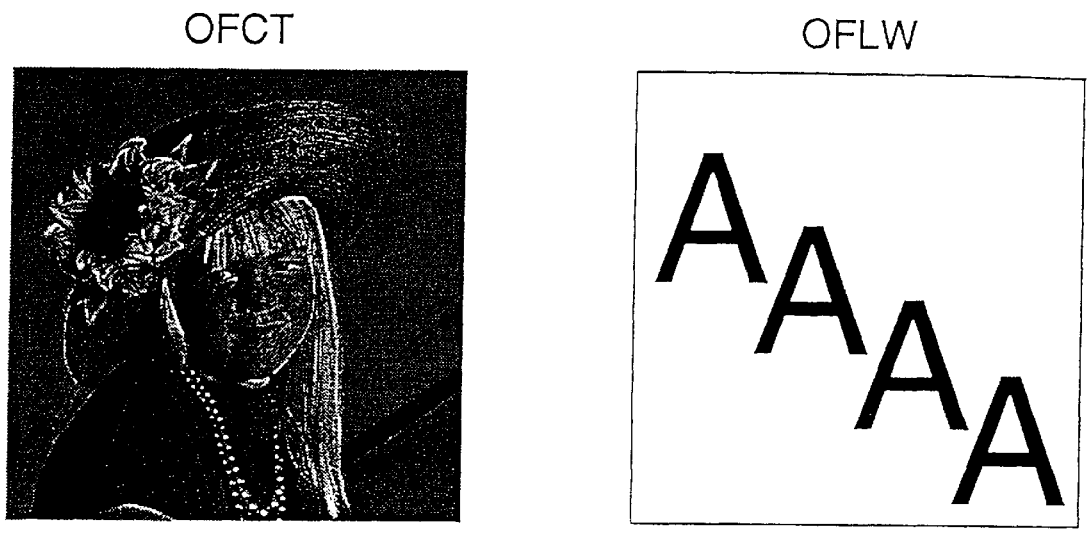
FIG. 10 illustrates separate continuous tone and linework files resulting from completion of the process; and, FIG. 11 illustrates a completed lenticular product comprising a sheet printed in accordance with the material provided by the process in combination with a sheet of lenticular lens material.

Also as a portion of step 310, the continuous tone and linework images are plotted on a high resolution film plotter to produce a map illustrating the features of the composite image. The plotter used for this may be any plotter capable of accommodating continuous tone and linework file formats such as the OFCT and OFLW files indicated in FIG. 1. Such a plotter is the Dolev 800 plotter commercially available from the Scitex Corporation, Ltd. of Herzliya, Israel. The respective plots are as represented in FIG. 10. Once these plots are generated, then as indicated at step 320, they are proofed to insure their accuracy. If acceptable, then the plots, the respective files OFCT and OFLW, the files for the respective four colors cyan, magenta, yellow and black, and/or other colors as defined by the customer, as well as film. All of this material is now provided to the customer. If a problem is indicated on the prepress proof, then the appropriate process steps are repeated until an acceptable result is obtained. Once accepted by the customer, the customer can use the output materials provided to him to print the resulting composite image incorporating whatever special visual effects the customer decided upon using an appropriate printing technique.

What has been described is a lenticular prepress operation by which graphic and textual material is readily combined. The process produces a high resolution film plot of interlaced images, continuous tone and linework files, digital files of the interlaced images for use with printers, and color plates for both the four basic colors used in printing, as well as any special color plates. The process is usable with a variety of artwork made available in different media. The artwork is digitized and representative files are created, the contents of which are then processed in accordance with defined specifications. Importantly, the resulting product is an interlaced series of image segments which, when viewed through an appropriate lenticular lens produces one or more selected visual effects.

The process produces a plotted image map in which boundaries and edges are sharp and distinct, which is conformed to the particular lenticular lens material used with the final product, in which fixed image elements are appropriately cited and in which masked areas representing portions of a final product to be merged from another file are properly established. With respect to the linework portion of the process, it will be noted that type and line art produced in the subsequent printing operation are sharply delineated and have very smooth edges.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

We claim:

1. A method for interlacing and mapping a plurality of graphic images, each including continuous tone and/or linework portions, to a lenticular lens comprising:

creating a digitized pixel array of each separate image with a continuous tone portion of the image including a plurality of data bits representing a particular address corresponding to the location of a pixel in the image and a value representing the particular color which occurs at that location, and a linework portion of the image including a plurality of data bits representing a starting location and an ending location within the image and a value representing a particular color which is continuous between the respective locations;

separately assembling a continuous tone image and a linework image from each pixel array;

combining segments of each continuous tone image in a predetermined pattern with segments from each of the other continuous tone images so as to interlace portions of the respective images and produce a resulting composite image;

separately combining segments of each linework image in a predetermined pattern with segments from each of the other linework images so as to interlace portions of the respective images and also produce a resulting composite image; and, producing from the respective interlaced continuous tone and linework images a plot whose features represent a map of the combined composite images, said map being used in a subsequent printing operation to produce a printed image viewed through a lenticular lens.

2. The method of claim 1 wherein interlacing said continuous tone and linework images produces at least one of the following desired visual effects: two-phase flip images, and multi-phase images simulating motion of an object, movement of an object toward or away from a viewer, transformation of one object into another object, and simulated depth of an object with respect to other objects.

3. The method of claim 1 wherein at least one of said graphic images may be of a different size and image resolution and assembling continuous tone and linework images from said pixel arrays of said images includes modifying each pixel array so the resulting modified arrays are all uniform in size and image resolution.

4. The method of claim 3 wherein assembling continuous tone and linework images includes forming raster file images from said modified pixel arrays, and combining segments of each continuous tone and linework image includes arranging individual defined portions of one raster image file with defined portions of the other raster image files in said predetermined pattern.

5. The method of claim 3 wherein combining segments of said continuous tone and linework images includes discarding portions of each pixel array not interlaced with portions of other images.

6. The method of claim 5 further including adding and deleting portions of continuous tone or interlaced images which are placed at each end of said composite image.

7. The method of claim 5 further including adding and deleting portions of interlaced pixel array segments to conform the resulting composite image to a sheet of lenticular material which is used with the printed version of the composite image.

8. The method of claim 1 further including producing digital files for the continuous tone and linework portions of the composite image.

9. The method of claim 8 wherein said composite image is printed in at least one color and said process further includes creating separate files from said map for each color used in said subsequent printing process.

10. The method of claim 9 wherein creating separate files includes creating a file for each basic color used in the printing process and/or for any special or additional color used in the printing process.

11. A method for interlacing and mapping textual and other non-continuous tone images to a lenticular lens comprising:

creating a separate linework image from each of said textual and non-continuous tone images;

assembling a digital file from each of the linework images and producing a separate raster image file for each image, each digital file including a plurality of data bits identifying a starting location and an ending location within the image and a value representing a particular color which is continuous between the respective locations;

combining segments of each raster image file in a predetermined pattern with segments from the other raster image files to interlace the respective linework images and form a composite image; and, producing from the composite image a plot whose characteristics represent a map of interlaced images, said map being used in a subsequent printing operation to produce a printed image viewed through a lenticular lens.

12. The method of claim 11 further including simultaneously interlacing and mapping digitized graphic images with the interlaced linework images and producing a plot whose features represent a map of the interlaced continuous tone and linework images for use in the printing operation.

13. The method of claim 12 wherein each said linework image comprises a pixel array, at least one of said pixel arrays being of a different size and image resolution and assembling said linework images includes modifying each pixel array so the resulting modified arrays are all uniform in size and image resolution.

14. The method of claim 11 wherein combining segments of said linework images includes discarding portions of each pixel array not interlaced with portions of other linework images.

15. The method of claim 14 further including adding and deleting portions of interlaced pixel array segments to conform the resulting composite image to a sheet of lenticular material which is used with the printed version of the composite image.

16. The method of claim 15 wherein said composite image is printed in at least one color and said process further includes creating from said map separate files for each color used in said subsequent printing process.

17. The method of claim 16 wherein creating separate files includes creating a file for each basic color used in the printing process and/or for any special or additional color used in the printing process.

18. A lenticular prepress process for producing a composite image from a plurality of continuous tone and linework images comprising:

separately digitizing each of said continuous tone images and said linework images and creating a separate digital file for each image, a continuous tone portion of each image file including a plurality of data bits representing particular addresses corresponding to the locations of pixels within the image and a value representing the particular color which occurs at the respective locations, and the linework portion of the each image file including a plurality of data bits representing a starting location and an ending location within the image and a value representing a particular color which is continuous between the respective locations;

separately assembling the continuous tone image digital files and linework image digital files;

creating a computerized file of the assembled continuous tone images and separately creating a computerized file of the linework images;

combining segments of said continuous tone images from said assembled continuous tone files in a predetermined pattern to form an interlaced continuous tone image;

combining segments of said linework images from said assembled linework files in a predetermined pattern to form an interlaced linework image;

linking the resulting interlaced continuous tone and line work images to produce a composite image; and producing from the composite image a plot whose characteristics represent a map of interlaced continuous tone and line work images, said map being used in a subsequent printing.

19. The process of claim 18 wherein said digitized continuous tone and linework images are each formed by a pixel array each of which may be of a different size and image resolution and assembling said continuous tone and linework images includes modifying each pixel array so the resulting modified arrays are all uniform in size and image resolution.

20. The process of claim 19 wherein combining segments of said continuous tone and linework images includes discarding portions of each pixel array not interlaced with portions of other continuous tone or linework images respectively.

21. The process of claim 20 further including adding and deleting portions of interlaced pixel array segments to conform the resulting interlaced composite image to a sheet of lenticular material which is used with the printed version of the composite image.

22. The process of claim 21 wherein said composite image is printed in at least one color and said process further includes creating from said map separate files for the continuous tone and linework portions of the composite image and for each color used in said subsequent printing process.

23. The process of claim 22 wherein creating separate files includes creating a file for each basic color used in the printing process and/or for any special or additional color used in the printing process.

24. The process of claim 18 wherein combining segments of said continuous tone images and said linework images each further includes producing a separate raster image file for the respective continuous tone and linework images.

* * * * *